United States Patent [19]

Hou

[11] Patent Number: 5,707,738
[45] Date of Patent: Jan. 13, 1998

[54] BLACK ELECTROPHORETIC PARTICLES AND METHOD OF MANUFACTURE

[75] Inventor: Wei-Hsin Hou, Bethlehem, Pa.

[73] Assignee: Copytele, Inc., Huntington Station, N.Y.

[21] Appl. No.: 306,134

[22] Filed: Sep. 14, 1994

Related U.S. Application Data

[62] Division of Ser. No. 141,867, Oct. 22, 1993, Pat. No. 5,643,673, which is a division of Ser. No. 901,755, Jun. 22, 1992, Pat. No. 5,298,833.

[51] Int. Cl.$^6$ ............... H01B 3/24; B32B 9/00; B32B 19/00
[52] U.S. Cl. ............... 428/402; 252/570; 313/483; 428/402.24; 428/403; 428/500; 428/515; 428/689
[58] Field of Search ............... 313/509, 483; 428/402, 402.24, 403, 500, 515, 689; 252/570

[56] References Cited

U.S. PATENT DOCUMENTS

| | | | |
|---|---|---|---|
| 3,668,106 | 6/1972 | Ota | 359/296 |
| 4,126,528 | 11/1978 | Chiang | 204/180 R |
| 4,298,448 | 11/1981 | Müller et al. | 204/299 R |
| 4,655,897 | 4/1987 | DiSanto et al. | 204/299 R |
| 5,403,518 | 4/1995 | Schubert | 252/572 |

OTHER PUBLICATIONS

Ruthenium Tetroxide for Fixing and Staining Cytoplasmic Membranes; Gaylarde et al.; Sep. 13, 1968 in Science, vol. 16, pp. 1157–1158.

Ruthenium Tetroxide as a Staining Agent for Unsaturated and Saturated Polymers; Vitali et al.; Oct. 1980, in Polymer, vol. 21, pp. 1220–1222.

Electron Microscopy of PS/PMMA and Rubber–Modified Polymer Blends: Use of Ruthenium Tetroxide as a New Staining Agent: Trent et al.; 1981 in Journal of Polymer Science; Polymer Letters Edition, 19, vol. 19, pp. 315–319.

Ruthenium Tetraoxide Staining of Polymers for Electron Microscopy; Trent et al.; 1983 in America Chemical Society, Macromolecules, vol. 16, No. 4, pp. 589–598.

*Primary Examiner*—Paul J. Thibodeau
*Assistant Examiner*—Stephen Sand
*Attorney, Agent, or Firm*—Plevy & Associates

[57] ABSTRACT

The present invention are dielectric black particles for use in electrophoretic images displays, electrostatic toner or the like, and the corresponding method of manufacturing the same. The present invention black particles are latex particles formed by a polymerization technique, wherein the latex particles are stained to a high degree of blackness with a metal oxide.

11 Claims, 1 Drawing Sheet

BLACK ELECTROPHORETIC PARTICLES AND METHOD OF MANUFACTURE

FIELD OF THE INVENTION

This is a division of a divisional application Ser. No. 08/141,867, filed Oct. 22, 1993 now U.S. Pat. No. 5,643,673 which is a divisional of application Ser. No. 07/901,755, filed Jun. 22, 1992, which is now U.S. Pat. No. 5,298,833, which issued on Mar. 29, 1994.

The present invention relates to dielectric black particles for use in electrophoretic image displays, electrostatic toner or the like and the corresponding method of manufacturing the black particles. More particularly, the present invention relates to polymer latexes, prepared by an emulsion polymerization technique, wherein the polymer latexes are reacted with a metal oxide forming black dielectric particles that have physical characteristics, such as size, density, and surface functionality selectively determined by varying the polymerization reaction.

BACKGROUND OF THE INVENTION

The electrophoretic effect is a well known and the prior an is replete with a number of patents and articles which describe the effect. As will be recognized by a person skilled in the art, the electrophoretic effect operates on the principle that certain particles, when suspended in an medium, can be electrically charged and thereby caused to migrate through the medium to an electrode of opposite charge. Electrophoretic image displays (EPID) utilize the electrophoretic effect to produce desired images. In prior art EPID colored dielectric particles are suspended in a fluid medium that is either clear or of an optically contrasting color as compared to the dielectric particles. The colored electrophoretic particles are then caused to selectively migrate to, and impinge upon, a transparent screen, thereby displacing the fluid medium against the screen and creating the desired image.

As will be recognized by a person skilled in the art, the selection of the electrophoretic particles used in the EPID is very important in determining the performance of the EPID and the quality of the viewed image produced. Ideally, electrophoretic particles should all be of a uniform size, to help in assuring that each of the electrophoretic particles will behave similarly. Additionally, it is desirable to utilize electrophoretic particles that have essentially the same density as the fluid medium in which they are suspended. By using electrophoretic particles of essentially the same density as the suspension medium, the migration of the electrophoretic particles through the medium remains independent of both the orientation of the EPID and the forces of gravity.

To affect the greatest optical contrast between electrophoretic particles and the suspension medium, it is desirable to have either white particles suspended in a black medium or black particles suspended in a backlighted clear medium. In the prior art, it has proven difficult to produce black electrophoretic particles that are dielectric, of uniform size, and which have a density matching that of a common suspension medium. As a result, EPIDs commonly use readily manufactured light colored electrophoretic particles suspended in dark mediums. Such EPIDs are exemplified in U.S. Pat. Nos. 4,655,897 to DiSanto et al., 4,093,534 to Carter et al, 4,298,448 to Muller et al., and 4,285,801 to Chaing. In such prior art where light particles are suspended in a dark medium, the suspension often appears grayish until the application of an electric field. With the electric field applied, the right colored particles migrate through the grayish suspension producing a right image on a gray background, thereby resulting an image that is not highly contrasted.

To produce a more contrasted image, it is desirable to backlight suspended black particles in a clear medium; However, as has been mentioned, the development of suitable dielectric black particles remains a long felt need in the art of electrophoretic image displays. In arts other than EPIDs, black particles are commonly produced from carbon. However, carbon blacks are not readily adaptable to EPIDs because carbon blacks are conductive and the density of carbon blacks is not readily matched to a suitable suspension medium, Research efforts have been made in an attempt to solve the density and conductivity problems of carbon blacks, however, none has succeeded without trading off the blackness (i.e. energy absorbency) of the particles create& Such efforts to produce dielectric particles from carbon blacks are exemplified in the following articles: Fowkes et al. "Electrophoretic Display Medium". a research project report for the Department of Chemistry at Lehigh University (Aug. 28, 1989) and Hou et al. "Polymer-Encapsulated Particles With Controlled Morphologies." PH.D Dissertation, (Lehigh University, 1991).

The present invention does not use carbon black as the source of the electrophoretic particle. Rather, composite latexes stained with a metal oxide are used to form the dielectric black particles suitable for use in a EPID. More particularly, the preferred embodiment of the present invention produces black particles from seeded emulsion polymerization techniques, used to produce core/shell latex structures with the residual double bonds, that are stained black with a metal oxide. The density, blackness, particle size and surface characteristics of the present invention black particle are controlled by the polymer composition, crosslink density, residual double bond density and reaction conditions.

The development of particles from synthesized core/shell latexes has been addressed in numerous technical articles, as exemplified by the following: Wessling et al. "A Study Of Emulsion Polymerization Kinetics by the Method of Continuous Monomer Addition." Journal of Macromolecular Science., A7 (3), pp. 647–676 (1973); Keusch et al. "The Growth of Polystyrene Latex Particles." Journal of Macromolecular Science., A7 (3) pp. 623–646 (1973); Grancio et al. "The Morphology of the Monomer-Polymer Particle in Styrene Emulsion Polymerization." Journal of Polymer Science., vol. 8, pp 2617–2629 (1970); Grancio et al. "Molecular Weight Development in Contrast-Rate Styrene Emulsion Polymerization." Journal of Polymer Science., vol. 8, pp. 2733–2745 (1970); and Wiener, H. "Polymerization in the System Vinylidene Chloride-Potassium Laurate-Potassium Persulfate", Journal of Polymer Science vol. 7, pp. 1–20 (1951). Of more direct relation to the present invention process of producing black particles are the below referenced articles.

In Daniels et al. "Preparation of Acrylonitrile/Butadiene/Styrene Latexes Using Hydroperoxide Redox Initiators." Journal of Applied Polymer Science, vol 41, pp. 2463–2477 (1990), an acrylonitrile/butadiene/styrene composite latex is shown where the polybutadiene core is uniformly surrounded by a poly(styrene-co-acrylonitrile) shell In Daniels, batch and semi-continuous seeded emulsion polymerization techniques are used with varying core and shell ratios and other reaction parameters.

In Merkel, M. P. "Morphology of Core/Shell Latexes and their Mechanical Properties" PH.D. Dissertation (Lehigh University 1986), seeded emulsion polymerization is utilized to synthesis polybutadiene-poly(methyl methacrylate) core/shell latexes. The core/shell latexes have various levels of crosslink density of the core and various thickness of the shell.

In Sundberg et al. Journal of Dispersion Science Technology vol. 5, pp. 433 (1984), synthesized polybutadiene-polystyrene core-shell latexes are studied in various conditions, such as monomer/polymer ratio, initiator level, degree of conversion and concentration of chain transfer agent, to determine grafting efficiencies of styrene onto polybutadiene latexes.

The use of staining agents on polymers was first used to form contrasts helpful in viewing polymer structures through electron microscopy. The prior art pertaining to such polymer staining is exemplified in the following articles. In Gaylarde et al. Science, vol 161, pg. 1157 (1968) ruthenium tetraoxide was used as a staining agent for polymeric materials in electron microscopy., In Vitali et al. Polymer, vol 21, pg. 1220 (1980) ruthenium tetraoxide was used to improve image contrast for polybutadiene lattices, a terpolymer of acrylnitride, butadiene and styrene, and an acrylnitrile-styrene-acrylnitrile polymer. In Trent et al. Journal of Polymer Science, volume 19, pg. 315 (1981), ruthenium tetraoxide was used in vapor staining polystyrene/poly (methylmethacrylate) blends for electron microscopy studies. Finally, in Trent et al. Macromolecules, vol 16, pg. 589 (1983) ruthenium tetraoxide was shown having the capability of staining both saturated and unsaturated polymer systems that contain ether, arene, alcohol, aromatic, amide, or olefin moieties.

However, none of the above referenced prior art addresses a process of producing dielectric particles having a high degree of blackness with a controlled density and particle sizes so as to be adaptable to an electrophoretic image display. It is, therefore, an object of the present invention to provide an improved electrophoretic particle that has a high degree of blackness, a controlled particle size, surface functionality and density so as to be readily suspended in the liquid medium of an electrophoretic image display.

SUMMARY OF THE INVENTION

The present invention relates to black dielectric particles that can be used in an electrophoretic image display and the corresponding method of producing the shine. To produce the present invention black particles, latex particles are produced using an emulsion polymerization technique. The latex particles produced contain residual double bonds which are then reacted with a metal oxide to produce a desired degree of blackness.

In a preferred embodiment the latex particles are formed having a core polymer surrounded by at least one shell of a differing polymer. The core structures are polymers with residuals double bonds such as polybutadiene and polyisoprene and the shell structures are polymers with different functionalities such as poly(methacrylic acid) and poly (methyl methacrylate) or copolymers such as poly(styrene-co-methacrylic acid) and poly(styrene-co-methyl methacrylate). The residual double bonds of the core structures are then reacted with a metal oxide such as osmium tetraoxide to form a complex structure which efficiently absorbs incident light and provides a high degree of blackness. The blackness of the core/shell particles is dependent upon the residual double bond density of the core, the shell thickness, the core/shell ratio, particle size and the degree of staining. The surface characteristics of the particles are controlled by the chemical composition of the shell structure. The black particles also have controlled mechanical properties which are dependent upon the crosslink density as well as the composition of the core and shell structures. Since the core structure and shell structure can be made from differing polymers and formed in any ratio, the density of the black particle can be controlled by selecting the size of the particle to be made, the latex material to be used and the ratio of the core structure to the shell structure. As such, the present invention black particles can be formed with a desired density so as to match the density of a desired suspension medium in a electrophoretic image display.

BRIEF DESCRIPTION OF DRAWINGS

The sole FIGURE is a cross sectional view of an electrophoretic display containing dielectric black particles produced in accordance with the one preferred embodiment of the present invention.

DETAILED DESCRIPTION OF THE INVENTION

Figure 1:
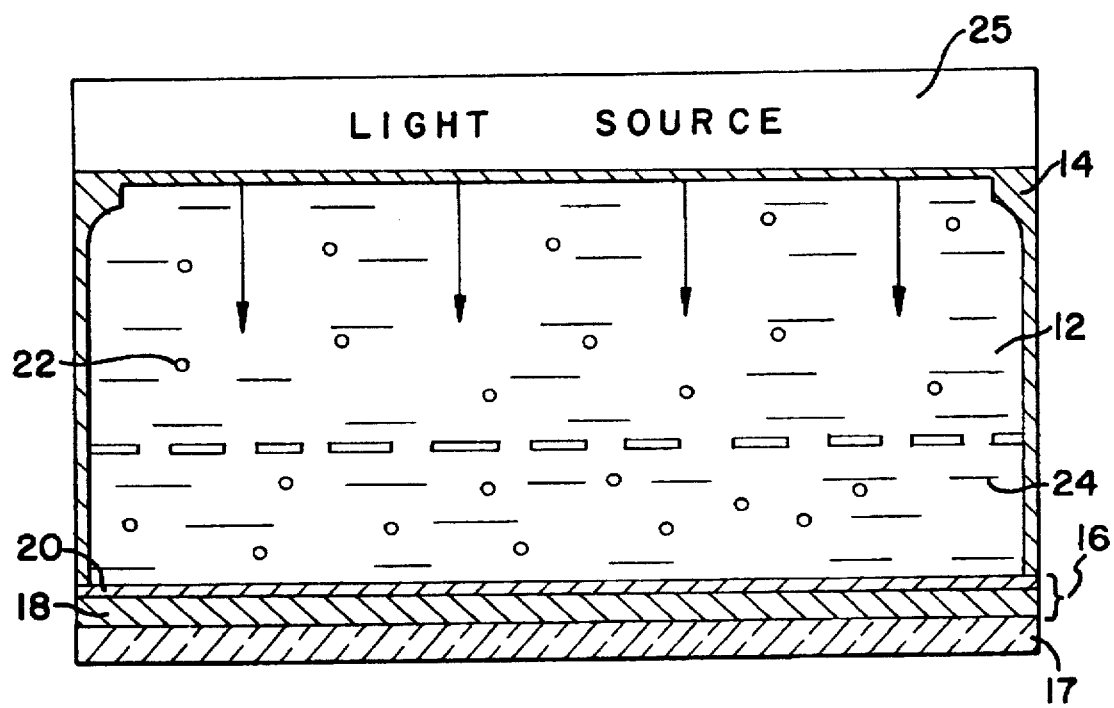

Although the present invention black particles can be used in many different applications where particles of high blackness and low density are desired, such as paint, ink, and electrostatic toner, it is especially suitable for use in connection with electrophoretic image displays (EPID). Accordingly, the present invention black particles will be described in connection with a typical EPID.

Referring to FIG. 1, there is shown a cross sectional view of an electrophoretic image display 10. As will be recognized by a person skilled in the art, an EPID 10 containing a volume of an electrophoretic dispersion 12 encapsulated between a anode structure 14 and a cathode structure 16. The cathode structure 16 is comprised of glass plate 17 on which is deposited a thin layer 18 of indium-tin-oxide (ITO) or a like compound. The ITO layer 18 is deposited in such a manner so as to be substantially transparent when viewed through the glass plate 17. Cathode lines 20 are etched onto the ITO layer 18 in a pattern of parallel lines. The anode has a similar set of parallel ITO lines 26, which are perpendicular to those on the cathode. A conductive mesh 27 sits in the fluid between the cathode and anode.

In the present invention, the electrophoretic dispersion 12 is comprised of black dielectric electrophoretic particles 22 suspended in a clear medium 24. The electrophoretic particles 22 have a density substantially equivalent to that of the fluid medium 24 so as to remain randomly disperse in the fluid medium 24, unaffected by the orientation of the EPID 10 or the effects of gravity. When an electrical bias is applied to the cathode lines 20, the anode lines 26 and the mesh in proper sequence, the electrophoretic particles 22 migrate to selected positions on the cathode lines 20 creating an image viewable through the glass plate 17. The migration of the black electrophoretic particles 22 to the cathode displaces the clear medium 24 adjacent to the ITO layer 18, thereby blocking the light produced by the light source 25. The remainder of the particles 22 sit on the mesh and do not block light from source 25. Consequently, black electrophoretic particles 22 can be seen through the glass plate 17, resulting in a black image contrasted against a light background.

As has been indicated previously in the Background of the Invention, the production of a black image on a light background is highly desirable. However, a major problem associated with any EPID is the creation of dielectric black particles that have a density that can be readily matched with common suspension fluids. The present invention black electrophoretic particles 22 are formed from composite latexes using seeded emulsion polymerization techniques. The composite latexes are then reacted with a metal oxide which stains the residual double bonds of the latexes black. Latexes are dielectric materials, as are metal oxides, consequently the resulting black particles formed from the latexes are dielectric. Additionally, utilizing varying core and shell latexes, black particles of low density can be readily obtained. By varying the latex materials used, size of the particles produced and the ratio between the core and shell polymers and the density of the black particles can be selectively adjusted. The resulting black particles can thereby be formed to have a desired density, in the rage of 0.8 to 1.4 gm/cm$^3$, allowing the black particles to have the same density as many suspension media.

To form the present invention dielectric black electrophoretic particles 22, core/shell latex structures are prepared by batch and semi-continuous seeded emulsion polymerization techniques. As will be recognized by a person skilled in the art, the creation of a core/shell composite latex by seeded emulsion polymerization includes synthesizing a seed latex by traditional emulsion polymerization, swelling the seed particles with a second stage monomer and then polymerizing the second stage monomer during the second stage polymerization to encapsulate the seed particles within a newly formed shell polymer. In the present invention, the core structures are manufactured as polymers containing residual double bonds, such as polybutadiene or polyisoprene. The shell structures are manufactured as polymers having different functionalities from the core structure, such as poly(methacrylic acid) and poly(methyl methacrylate) or copolymers such as poly(styrene-co-methacrylic acid) and poly(styrene-co-methyl methacrylate). The residual double bonds of the core structures are then stained with a metal oxide to form a complex structure with a high degree of blackness, wherein the degree of blackness is dependent upon the residual double bond density of the core structure, the thickness of the shell structure, the ratio between the core and shell structures, the overall size of the core/shell structure and the degree of the reaction with the metal oxide.

PROCESS ONE

In an exemplary embodiment of the present invention method for producing the electrophoretic black particles 22, the core structure, commonly called a seed latex is prepared by emulsion polymerization in a closed container. The core structure is a crosslinked polybutadiene-co-styrene) latex formed from the polymerization recipe described in Table I below.

TABLE I

| Materials | Weight (g) |
|---|---|
| styrene | 8.0 |
| butadiene | 35.0 |
| distilled-deionized water | 100.0 |
| dioctyl sodium sulfosuccinate | 0.07 |
| octyl phenoxy polyethoxy ethanol | 0.24 |
| potassium persulfate | 0.4 |
| divinylbenzene | 0.4 |

Prior to use, the inhibitors of the monomers butadiene and styrene and the crosslinker divinylbenzene are removed by standard methods of passing each of the monomers through a column containing the appropriate inhibitor remover. In this, and subsequent processes, the butadiene is of the type commercially available from Air Products and Chemicals, Inc. The styrene is of the type commercially available from Fisher Scientific, Inc., and the divinylbenzene is of the type commercially produced by Dow Chemicals, Inc.

The octyl phenoxy polyethoxy ethanol (also known as Triton X-45 manufactured by Rohm and Haas, Inc.) and dioctyl sodium sulfosuccinate (also known as Triton X-200 manufactured by Rohm and Haas, Inc.) are used as emulsifiers and are dissolved in the distilled-deionized water and charged into a closed container. The styrene and divinylbenzene are combined and mixed with an initiator of potassium persulfate manufactured by Fisher Scientific, Inc. After the styrene, divinylbenzene, and potassium persulfate are combined, the combination is charged to the closed container containing the Triton X-200 and Triton X-45 emulsifier solution. The closed container is then purged with nitrogen. The butadiene monomer is then condensed and weighted into the closed container. The butadiene can be considered with any known method but is preferably condensed using isopropanol cooled with liquid nitrogen. The container, containing the composite mixture is the warmed and agitated for a desired reaction time. In one preferred embodiment the mixture is tumbled at fifteen revolutions per minute for forty eight hours at seventy degrees celsius. At the end of the forty eight hour period, the core structures of poly(butadiene-co-styrene) namely, seed particles, are formed that are monodisperse in size having a diameter of approximately 286 nm; as they would appear in a TEM photograph.

A shell structure of poly(styrene-co-methacrylic acid) is formed around the polybutadiene-co-styrene) core structure by batch seeded emulsion copolymerization. The shell structure for the poly(styrene-co-methacrylic acid) polymer is formed from the polymerization recipe described in Table II below.

TABLE II

| Materials | Weight (g) |
|---|---|
| poly(butadiene-co-styrene) | |
| seed latex | 5.0 |
| styrene | 1.5 |
| methacrylic acid | 0.2 |
| divinylbenzene | 0.1 |
| potassium persulfate | 0.02 |
| distilled-deionized water | 40.0 |

To form the poly(styrene-co-methacrylic acid) shell structure around the poly(butadiene-co-styrene) core structure the polybutadiene-co-styrene) seed latex are placed in a container with the styrene, divinylbenzene and a methacrylic acid monomer, such as that manufactured by Aldrich Chemical, Inc. The container is then purged with nitrogen and the polybutadiene-co-styrene) core structures are swelled in the presence of the other monomers at room temperature. The poly(butadiene-co-styrene) core structures are swelled to a desired degree and are then combined with the potassium persulfate initiator. In the preferred embodiment, the combination is then heated to sixty degrees celsius and tumbled at thirty revolutions per minute for twenty four hours. As a result of the above process, poly (butadiene-co-styrene)/poly(styrene-co-methacrylic acid) core/shell structures are produced having a diameter of approximately 480 nm of which approximately 50 nm is a result of the poly(styrene-co-methacrylic acid) shell structure thickness.

Two percent, by weight, aqueous solution of osmium tetroxide is then added to the core/shell latex so as to react with, and stain, the resulting residual double bonds. The con/shell latex is tumbled with the osmium tetroxide solution at room temperature for a desired reaction time, thereby resulting in a core/shell latex, having a desired degree of blackness, that can be used as the present invention electrophoretic particles 22. In regard to the advantages set forth hereafter in process two. It should be understood that in place and stead of the osmium tetroxide, ruthenium tetroxide or other metal oxides may also be used.

The above described method of manufacture, utilizing the polybutadiene-co-styrene) core structure produced by the polymerization recipe of Table I and the poly(styrene-co-methacrylic acid) shell structure produced by the polymerization recipe of Table II, produce black particles of a given blackness, size, hardness and surface characteristics. By varying the polymerization recipes of Tables I and II and by varying other reaction parameters of the method of manufacture, the physical characteristic of the black particles produced can be selectively altered as needed for a given application.

By varying the degree of conversion and the mount of the divinylbenzene crosslinker present in the creation of the polybutadiene-co-styrene) core structures, the concentration of the residual double bonds present in the polybutadiene-co-styrene) core structure can be altered. The degree of conversion during polymerization is dependent upon the reaction time which can be varied from twenty four hours to seventy two hours to obtain fifty percent to ninety nine percent of conversion. A higher degree of conversion leads to fewer residual double bonds left in the core structure. The polymerization recipe set forth in Table I calls 0.4 gms of divinylbenzene. However, the amount of divinylbenzene can be varied from 0.0 gm to 1.2 gms. Consequently, the concentration of residual double bonds will vary as a function of the concentration of divinylbenzene within the given range. Since the residual double bonds present in the core/shell structure is what reacts with the metal oxide, by varying the concentration of residual double bonds the blackness of the end product electrophoretic particles can be selectively varied as desired. Additionally, by varying the concentration of residual double bonds, the hardness of the end product electrophoretic particles can also be varied within the available range.

The blackness and hardness of the produced particles may also be effected by altering the butadiene:styrene monomer ratio used in the poly(butadiene-co-styrene) core structure polymerization recipe of Table I. In Table I, the given butadiene:styrene monomer ratio was 35:8. In order to selectively control the hardness and blackness of the end product electrophoretic particles, the butadiene:styrene ratio in the polybutadiene-co-styrene) core structure can be changed form the Table I value of 35:8 to 39:4, 31:12, 27:16, or 23:20 as desired. In addition to butadiene, other conjugated diene compounds (e.g. isoprene) or any compound containing more than one double bond (e.g. diacrylate, triacrylate, tetraacrylate, dimethacrylate and trimethacrylate compounds) can also be used as stained component.

In emulsion polymerization there are many variables such as swell time, reaction time and polymerization recipe that can be altered to affect the size of the formed core structure and the ratio between the size of the core structure and the surrounding shell structure. In the present invention, the size of the poly(butadiene-co-styrene) core structures are preferably controlled by varying the concentration and types of emulsifiers present in the poly(butadiene-co-styrene) core structure polymerization recipe. In the polymerization recipe of Table I, 0.07 gms of Triton X-200 and 0.24 gms of Triton X-45 emulsifiers are used. It should be recognized by a person skilled in the art that by varying the concentrations of the emulsifiers during polymerization, the size of the poly (butadiene-co-styrene) core structure can be selectively controlled. Preferably in the polymerization recipe of Table I, the Triton X-200 emulsifier can be varied from between 0.0 gms and 0.14 gms while the Triton X-45 emulsifier can be varied from 0.16 gms to 0.40 gms. Anionic, cationic and nonionic emulsifiers or the combination for each type of emulsifier can be used in the emulsion polymerization. Specific examples of suitable emulsifiers are sodium lauryl sulfate, sodium dodecyl sulfate, Dowfax surfactants, Igepal surfactants, Aerosol surfactants, Pluronic surfactants, Cantrez surfactants, Arlacel surfactants, Tetronic surfactants, poly(vinlyalcohol), poly(ethylene oxide), and the like.

The physical characteristics of the end product electrophoretic particles can also be varied by varying the process and polymerization recipe for the poly(styrene-co-methacrylic acid) shell structure that surrounds the poly (butadiene-co-styrene) core structure. For example, the surface functionality of the final core/shell structure can be varied by varying the amount of methacrylic acid monomer present during polymerization. By varying the amount of methacrylic acid monomer from the 0.2 gms listed in Table II to 1.0 gm, the amount of carboxylic acid on the shell structure is changed thereby which affecting a change in the surface functionality of the end product electrophoretic particles. Additionally, it should also be understood that the use of a methacrylic acid monomer is exemplary and the surface functionality of the end product electrophoretic particles can be changed by substituting other monomers such as methyl methacrylate, acrylonitrile, vinyl chloride, acrylic acid, sodium styrene sulfonate vinyl acetate, chlorostyrene, dimethylaminopropylmethacrylamide, isocyanatoethyl methacrylate, N-(iso-butoxymethyl) acrylamide, or other similar functional monomers in place and stead of the methacrylic acid.

The shell thickness of the poly(styrene-co-methacrylic acid) shell structure, as well as the blackness and mechanical properties of the end product electrophoretic particles, can be selectively altered by varying the monomer:polymer ratio used in the second stage polymerization recipe. In the preferred embodiment of the second stage polymerization recipe, shown in Table II, the monomer:polymer ratio can selectively adjusted from 80:20 to 20:80 in order to affect the needed shell structure characteristics.

PROCESS TWO

In an alternative embodiment of the present invention, black particles are produced by emulsion polymerization which produces poly(styrene-co-methacrylic add) latex particles, In this embodiment poly(styrene-co-methacrylic acid) latex particles are prepared utilizing the polymerization recipe shown below in Table III.

TABLE III

| Materials | Weight (g) |
|---|---|
| styrene | 40 |
| methacrylic acid | 2 |
| distilled-deionized water | 100 |
| potassium persulfate | 0.4 |
| divinylbenzene | 0.4 |
| sodium lauryl sulfate | 1.2 |

In preparing the poly(styrene-co-methacrylic acid) latex particles, the contents of Table III were charged into a container, purged with nitrogen and agitated for a desired reaction time to complete polymerization. The resulting poly(styrene-co-methacrylic acid) latex particles are then either mixed with a two percent by weight aqueous solution of ruthenium tetraoxide or exposed to ruthenium tetraoxide vapor to stain the polystyrene component of the polymer particles. Because the interfacial tension between poly (methacrylic acid) and water is lower than that between polystyrene and water the methacrylic acid component will migrate to the surface of the particles during polymerization, which provides functional groups for surface charging.

Particles made by this process are spherical and are uniform in size, namely, monodisperse particles, which allow each particle to have uniform surface charge and charge/mass ratio to create uniform electrostatic images in electrophoretic image displays.

Poly(styrene-co-methacrylic acid) latex particles with different surface functionalities for surface charging can be formed by changing the functional monomer of methacrylic acid to other functional monomers such as acrylic acid, methacrylate, vinyl acetate, methyl methacrylate, acrylonitrile, sodium styrene sulfonate, dimethylaminopropylmethacrylam, isocyanatoethyl methacrylate, N-(iso-butoxymethyl) acrylamide, or other similar functional monomers.

Properties such as density, optical property glass transition temperature and mechanical strength of the poly (styrene-co-methaclryic acid) latex particles can be selectively altered by substituting the stained component form styrene to another vinyl monomer such as vinyl methyl ether, vinyl formal, vinyl alcohol, vinyl methyl ketone, ethylene, propylene or combination of the above to make homopolymer, or copolymer particles.

The size of the poly(styrene-co-methacrylic acid) latex particles can also be selectively controlled by varying the concentration and type of emulsifier used during the polymerization reaction. In the present invention, the sodium lauryl sulfate can be changed with anionic, cationic and nonionic emulsifiers or the combinations of each. Specific examples of suitable emulsifiers are sodium dodecyl sulfate, Dowfax surfactants, Igepal surfactants, Aerosol surfactants, Pluronic surfactants, Cantrez surfactants and the like.

In view of the above ruthenium tetraoxide can be used as a staining agent in place and stead of the osmium tetroxide. Ruthenium tetraoxide can stain a wide range of polymeric materials with varying structures and the density of ruthenium tetroxide is lower than osmium tetroxide. Consequently, electrophoretic particles having a high degree of blackness and a relatively low density can be created.

PROCESS THREE

In a third alterative embodiment of the present invention, black particles are produced by emulsion polymerization which produces poly(butadiene-co-styrene-co-methacrylic acid) latex particles. In this embodiment polybutadiene-co-styrene-co-methacrylic acid) particles are prepared utilizing the polymerization recipe shown below in Table IV.

TABLE IV

| Materials | Weight (g) |
| --- | --- |
| styrene | 12.0 |
| butadiene | 30.0 |
| methacrylic acid | 1.0 |

TABLE IV-continued

| Materials | Weight (g) |
| --- | --- |
| distilled-deionized water | 100.0 |
| Triton X-200 | 0.07 |
| Triton X-45 | 0.24 |
| potassium Persulfate | 0.4 |
| divinylbenzene | 0.4 |

The inhibitors of the butadiene, styrene, and divinylbenzene are removed in the manner previously described. To produce the present invention black particles the Triton X-200 and Triton X-45 emulsifiers are dissolved in the distilled-deionized water and charged to a container. In accordance with Table IV, the styrene, potassium persulfate and divinylbenzene are mixed and added to the emulsifier solution. The container holding the mixture is then purged with nitrogen and condensed butadiene is added. The resulting mixture is then held at 70° C. and agitated for a desired reaction time of preferably forty eight hours. As a result of the process, poly(butadiene-co-styrene-co-methacrylic acid) latex particles are formed.

The poly(butadiene-co-styrene-co-methacrylic acid) latex particles are stained black by being reacted with 2% by weight aqueous solution of osmium tetroxide, ruthenium tetroxide or similar metal oxide. The metal oxide solution and poly(butadiene-co-styrene-co-methacrylic acid) latex particles are allowed to react at room temperature for approximately twenty four hours, thereby staining the poly (butadiene-co-styrene-co-methacrylic add) latex particles black The black particles are then collected for use in the electrophoretic displays.

As with previous embodiments, the size of black particles can be controlled by varying certain process parameters such as reaction time, emulsifier concentration, temperature, etc. However, in the present invention particles size as well as the blackness and hardness of the end product products can be controlled by varying the butadiene:styrene:methacrylic acid monomer ratio in the polymerization recipe. By varying the butadiene:styrene:methacrylic acid monomer ratio from 30:12:1, as shown in Table IV, to 30:11:2, 30:10:3, 20:22:1, 20:21:2 and 20:20:3 the diameter of the resulting polybutadiene-co-styrene-co-methacrylic acid) latex particles can be varied between 330 nm to 529 nm as desired. For example, a poly(butadiene-co-styrene-co-methacrylic acid) latex particle, produced as described above with a butadiene:styrene:methacrylic acid monomer ratio of 20:20:3 produces latex particles having a diameter of approximately 390 nm as measured from a TEM photograph. Similarly, poly(butadiene-co-styrene-co-methacrylic acid) latex particles having butadiene:styrene:methacrylic acid ratios of 20:21:2 and 20:21:1 produce particles having diameters of 480 nm and 510 nm; respectively, as measured from a TEM photograph.

The size of the polybutadiene-co-styrene-co-methacrylic add) latex particle can also be selectively controlled by varying the concentration and types of emulsifiers used during the polymerization reaction. In the present invention, particles can be controlled by varying the amount of Triton X-200 emulsifier present from between 0.0 gms and 0.14 gms. Additionally, the amount of Triton X-45 emulsifier can be varied from 0.16 gms to 0.40 gms to vary particle size. Anionic, cationic and nonionic emulsifiers or the combination of each type of emulsifier can be used in the emulsion polymerization. Specific examples of suitable emulsifiers are sodium lauryl sulfate, sodium dodecyl sulfate, Dowfax surfactants, Igepal surfactants, Aerosol surfactants, Pluronic surfactants, Cantrez surfactants, Arlacel sufactants, Tetronic surfactants, poly(vinyl alcohol), polyethylene oxide), polyacrylic acid and the like.

The polybutadiene-co-styrene-co-methacrylic acid) latex particle, although not technically a core/shell structure, is still dependent upon the concentration of residual double bonds to determine how black the particle will stain when reacted with a metal oxide. As with previous embodiments, the concentration of residual double bonds is dependent upon the degree of conversion, the ratio of monomers and concentration of divinylbenzene in the polymerization recipe. The amount of divinylbenzene in the polymerization recipe of Table IV can be varied between 0.0 gms and 1.2 gms to create a poly(butadiene-co-styrene-co-methacrylic acid) latex particle with a desired residual double bond concentration and therefore a desired blackness and hardness. In addition to butadiene monomer, other conjugated diene compounds (e.g. isoprene) or any compound containing more than one double bond (e.g. diacrylate, triacrylate, tetraacrylate, dimethacrylate and trimethacrylate) can also be used as a staining component. The degree of conversion can be varied from 50% to 99% depending upon the reaction time. A higher degree of conversion leads to fewer residual double bonds left in the final particles. Different monomer ratio give the final particles with varying blackness. A higher percentage of butadiene monomer leads to more residual double bonds left in the final particles.

The surface functionality of the poly(butadiene-co-styrene-co-methacrylic acid) latex particle may be effected by varying the mount of methacrylic acid monomer present in the original polymerization recipe. Additionally, surface functionality may be controlled as desired by substituting methyl methacrylate, acrylonitrile, acrylic acid, vinyl acetate, sodium styrene sulfonate, cholorstyrene, Dimethylamino aminapropyl propylmethacrylamide, Isocyanatoethyl methacrylate, N-(iso-butoxymethyl) acrylamide, vinyl chloride or other monomers in place and stead of the methacrylic acid.

PROCESS FOUR

In a fourth embodiment, black electrophoretic particles are made having a polystyrene core structure and a poly (butadiene-co-methacrylic acid) shell structure. The polystyrene core structure, namely, seed particles, is prepared by emulsion polymerization pursuant to the polymerization recipe set forth below in Table V.

TABLE V

| Materials | Weight (g) |
|---|---|
| styrene | 40 |
| distilled-deionized Water | 100 |
| potassium persulfate | 0.4 |
| sodium lauryl sulfate | 12 |
| divinylbenzene | 0.4 |

To produce the polystyrene seed latex, the inhibitors of the styrene and divinylbenzene are removed and the styrene, water, potassium persulfate, sodium lauryl sulfate and divinylbenzene are charged into a container, purged with nitrogen and agitated at 60° C. for a desired reaction time.

Utilizing a seeded emulsion polymerization method the poly(butadiene-co-methacrylic acid) shell structure is formed around the polystyrene core structure. The poly (butadiene-co-methacrylic acid) shell structure is formed utilizing the polymerization recipe set forth in Table VI below.

TABLE VI

| Materials | Weight (g) |
|---|---|
| polystyrene seed latex | 100 |
| butadiene | 20 |
| methacrylic acid | 2 |
| distilled-deionized Water | 80 |
| potassium persulfate | 0.4 |
| divinylbenzene | 4 |

The poly(butadiene-co-methacrylic acid) shell structure is formed by first placing the polystyrene seed latex in a container with the butadiene, methacrylic acid and divinylbenzene, whereby the polystyrene seed particles are allowed to swell to a desired degree. The potassium persulfate initiator is then added to the container and the polymerization reaction is held at 60° C. for a desired period of preferably forty-eight hours, thereby producing the desired polystyrene/poly(butadiene-co-methacrylic acid) core/shell structure.

The resulting core/shell structure is then mixed with a 2% by weight aqueous solution of osmium tetroxide, ruthenium tetroxide or another similar metal oxide, to produce a staining reaction with the residual double bonds of the core/shell structure. The staining thereby producing particles of a desired blackness for use in the electrophoretic display.

In the present embodiment the core structure is derived from styrene. It should be understood that core/shell structures having differing densities reflectivity, glass transition temperature and mechanical strength can be obtained by substituting either vinyl methyl ether, vinyl formal, vinyl alcohol, vinyl methyl ketone, acrylate, methacrylate, methyl, methacrylate, ethylene, propylene, like monomers or combinations thereof in place and stead of styrene.

Similarly, core/shell structures having different functional groups for surface charging can be obtained by replacing the methacrylic acid in the second stage polymerization recipe of Table VI with vinyl methyl ether, vinyl formal, vinyl alcohol, vinyl methyl ketone, acrylate, methacrylate, methyl methacrylate, dimethylaminopropylmethacrylamide, Isocyanatoethyl methacrylate, N-(iso-butoxymethyl) acrylamide, like functional monomers or combinations thereof.

Changes in residual bond density, particle size, blackness, hardness, and surface functionality can be affected in the manners previously described in relation to prior process embodiments.

PROCESS FIVE

In a fifth alternate embodiment, a multilayer composite structure is formed using a three step emulsion polymerization technique.

To create the original core structure a polystyrene core Structure is formed in the manner previously described in connection with Process Four, following the first stage polymerization recipe set forth in Table V. The polystyrene core structure is then subjected to a secondary polymerization process forming a first shell structure around the polystyrene core. The first shell structure is prepared, as previously described in Process Four, utilizing the second stage polymerization recipe of Table VI, except the methacrylic acid deleted from the polymerization recipe. As a result of the secondary polymerization process, a polybutadiene shell structure is formed, thereby producing a polystyrene/ polybutadiene core/shell latex.

The polystyrene/polybutadiene core/shell structure is then used as the seed for a third stage polymerization, wherein the polymerization recipe for the third stage polymerization is given in Table VII below.

TABLE VII

| Materials | Weight (g) |
|---|---|
| polystyrene/polybutadiene seed latex | 10 |
| styrene | 10 |
| methacrylic acid | 2 |
| distilled-deionized water | 40 |
| potassium persulfate | 0.4 |
| divinylbenzene | 1 |

To form the desired particle, the polystyrene/polybutadiene seed latexes are combined with the styrene, methacrylic acid and divinylbenzene, wherein the polystyrene/polybutadiene particles are allowed to swell for a given period to reach a desired degree. The potassium persulfate initiator is then added to the swelled polystyrene/polybutadiene particles and the combination is tumbled at 60° C. for a predetermined reaction time. The result of the third stage polymerization is a multilayered structure having two varied shell structures, wherein the first shell structure is a polybutadiene polymer and the second shell structure is a poly(styrene-co-methacrylic acid) copolymer.

The multilayered structures are then combined with 2% by weight aqueous solution of osmium tetroxide, ruthenium tetroxide, or like metal oxides to produce the desired black electrophoretic particles.

Particles formed with a multilayer structure, wherein middle layer is polybutadiene for providing the residual double bond needed for staining, can be produced to have a higher degree of blackness, a lower density and better mechanical properties than single shell structures by adding choices to the latexes that can be used to form the electrophoretic particles. In view of the above description, it should be understood by a person skilled in the art that multilayered composite latex can be formed with any multitude of layers, each created by its own unique polymerization recipe, so long as residual double bonds are formed at some point in the structure.

The described techniques for changing the particle size, residual double bond density, blackness, hardness, and surface characteristics in previous processes can be applied to the current multilayer structure. Additionally, multilayer structures of varying density, reflectivity, glass transition temperature and mechanical strength may be produced when the styrene, used in the original polymerization recipe, for the first stage polymerization process that produces the original core structures, is changed to vinyl methyl ether, vinyl formal, vinyl alcohol, vinyl methyl ketone, acrylate, methacrylate, methyl methacrylate, ethylene, propylene, other like monomers or combinations thereof. The density, reflectivity, glass transition temperature and mechanical strength of the multilayer structure can also be controlled by effecting the polymerization recipe for the third stage polymerization process as shown in Table VII. For example, density, reflectivity, glass transition temperature, and mechanical strength of the final particles can be altered as desired by replacing the styrene in Table VII with vinyl methyl ether, vinyl formal, vinyl alcohol, vinyl methyl ketone, acrylate, methacrylate, methyl methacrylate, ethylene, propylene, other like monomers or combinations thereof.

Additionally, the outer shell of the multilayer structure can be formed to have different functional groups for surface charging by varying the third stage polymerization recipe. More particularly, the methacrylic acid listed in Table VII can be changed to vinyl methyl ether, vinyl formal, vinyl alcohol, vinyl methyl ketone, acrylate, methacrylate, methyl methacrylate, ethylene, propylene, dimethylaminopropylmethacrylamide, isocyaratoethyl methacrylate, N-(iso-butoxymethyl) acrylamide or other similar functional monomers or combinations of the above.

It should be understood that the processes for forming the present invention particles, as specifically described in this specification are merely exemplary and a person skilled in the art may make numerous variations and modifications to the describe processes without departing from the spirit and scope of the invention. More particularly, it will be recognized by a person skilled in the art that many of the compounds found in the various polymerization recipes of Tables I through VII have chemical equivalents that have not been specifically stated. All such equivalents are intended to be included in the scope of the invention. Additionally, it will be recognized by a person skilled in the art that the method set forth in each described process for varying the size, hardness, blackness, density, residual double bond density, surface functionality, reflectivity, glass transition temperature and mechanical strength of the present invention particles can be applied to each other described process and a person skilled in the art may vary many other parameters such as the time and temperature to also vary the characteristics of the final product black particles. All such variations and modifications are intended to be included within the scope of the invention.

PROCESS SIX

In a sixth alternative embodiment of the present invention black electrophoretic particles are produced by creating core/shell structures wherein there exists a polystyrene core and a poly(methacrylic acid) shell. In this embodiment the polystyrene core is made pursuant to the polymerization recipe set forth below in Table VIII.

TABLE VIII

| Materials | Weight (g) |
|---|---|
| styrene | 40 |
| distilled-deionized | 100 |
| potassium persulfate | 0.4 |
| sodium lauryl sulfate | 12 |
| divinylbenzene | 0.4 |

The contents of Table VIII are charged into a container, purged with nitrogen and agitated for a desired reaction time and at a desired temperature. In the preferred embodiment, the contents are tumbled at 60° C. for thirty six hours. As a result of the polymerization reaction, polystyrene seed latexes are formed.

A second stage polymerization is then conducted utilizing the polystyrene particles as the seed latexes. In the second stage polymerization a poly(styrene-co-methacrylic acid) shell structure is formed around the polystyrene seed latexes. The poly(styrene-co-methacrylic add) shell structure is formed utilizing the polymerization recipe listed below in Table IX.

TABLE IX

| Materials | Weight (g) |
|---|---|
| polystyrene seed latex | 100 |
| styrene | 10 |

TABLE IX-continued

| Materials | Weight (g) |
| --- | --- |
| methacrylic acid | 2 |
| distilled-deionized water | 40 |
| potassium persulfate | 0.4 |
| divinylbenzene | 0.4 |

The polystyrene seed particles are swelled at room with the above listed monomers for a predetermined reaction time. The potassium persulfate initiator is then added to the container and the mixture is agitated for a desired reaction time. The resulting poly styrene/poly(styrene-co-methacrylic acid) latex are then stained by adding a two percent by weight aqueous solution of ruthenium tetroxide to the containers, reacting the same until a desired degree of blackness is obtained in the latex particles. Alternatively, the poly styrene/poly(styrene-co-methacrylic acid) latex may be exposed to ruthenium tetraoxide vapor to stain the polystyrene component.

The stained component in the present embodiment is the poly styrene. It will be recognized by a person skilled in the art that the stained component of styrene can be changed to vinyl methyl ether, vinyl formal, vinyl alcohol, vinyl methyl ketone, ethylene, propylene, other vinyl monomers or combinations of the above to make polymer particles having different properties such as density, reflectivity glass transition temperature and mechanical strength.

PROCESS SEVEN

In a seventh embodiment, black, electrophoretic particles are made having a hollow core structure and a multilayer shell structure. Firstly, a linear polystyrene core structure, namely, seed particle, is prepared by emulsion polymerization pursuant to the polymerization recipe set forth in Table X.

TABLE X

| Materials | Weight (g) |
| --- | --- |
| styrene | 40 |
| distilled-deionized water | 100 |
| potassium persulfate | 0.4 |
| sodium lauryl sulfate | 1.2 |

The polystyrene seed particles are then subjected to a secondary emulsion polymerization forming a first shell structure around the polystyrene core. The first shell structure is prepared, as previous described in Process Four, utilizing the second stage polymerization recipe of Table VI. As a result of the secondary polymerization process, a polybutadiene shell structure is formed, thereby producing a polystyrene/polybutadiene core/shell structure.

The polystyrene/polybutadiene core/shell latex used as the seed is then subjected to a third stage polymerization process forming a second shell structure around the polystyrene/polybutadiene core. The second shell structure is prepared, as previously described in Process Five, utilizing the third stage polymerization recipe of Table VII. The result of the third stage polymerization is a multilayered structure having two varied shell structures, wherein the first shell structure is a polybutadiene polymer and the second shell structure is a poly(styrene-co-methacrylic acid) copolymer.

Because the polystyrene core is a linear polymer which is soluble in its good solvents, such as tetrahydrofurane and toluene, the final multilayered composite particles (after the third stage polymerization) are mixed with a large amount of good solvent (e.g. toluene) and tumbled at room temperature for 48 hours to dissolve the linear polystyrene out of the core of the composite particles. The dissolved polystyrene and the good solvent are then removed resulting a multilayered composite structure with a hollow core.

The multilayered hollow composite particles are then combined with 2% by weight aqueous solution of a metal oxide to produce the desired black electrophoretic particle.

Particles formed with a hollow structure can be produced to have a density close to or lower than 1 g/cm$^3$ which can be easily dispersed in a low-density medium (e.g. decane and octane) without adding another high-density medium (e.g. carbon tetrachloride and tetrachloroethylene) and are easier to remain a good colloidal stability.

Particles formed with a multilayer structure, wherein middle layer is polybutadiene for providing the residual double bond needed for staining, can be produced to have a high degree of blackness, a low density and good mechanical properties by adding choices to the latexes that can be used form the electrophoretic particles. In view of the above description, it should be understood by a person skilled in the art that multilayered hollow composite latex can be formed with any multitude of layers, each created by its own unique polymerization recipe, so long as residual double bonds are formed at some point in the structure.

The described techniques for changing the particle size, residual double bond density, blackness, and surface characteristics in previous processes can be applied to the current hollow structure. The density, reflectivity, glass transition temperature and mechanical strength of the multilayer hollow structure can also be controlled by effecting the polymerization recipe for the third stage polymerization process as shown in Table VII. For example, density, reflectivity, glass transition temperature, and mechanical strength of the final particles can be altered by replacing the styrene in Table VII with vinyl methyl ether, vinyl formal, vinyl alcohol, vinyl acetate, vinyl methyl ketone, acrylate, methacrylate, methyl methacrylate, ethylene, propylene, other like monomers or combinations thereof.

Additionally the outer shell of the multilayer structure can be formed to have different functional groups for surface charging by varying the third stage polymerization recipe. More particularly, the methacrylic acid listed in Table VII can be changed to vinyl methyl ether, vinyl formal, vinyl chloride, vinyl methyl ketone, vinyl acetate, acrylic acid, sodium styrene sulfonate, methyl methacrylate, dimethylaminopropylmethacrylamide, isocyanatoethyl methacrylate, N-(iso-butoxymethacrylamide), other like functional monomers or combinations of the above.

Furthermore, in the described processes of the present invention batch emulsion polymerization was used. In addition to the latexes or core/shell composite latexes made by the emulsion polymerization or seeded emulsion polymerization, the polymer particles containing ether, arene, alcohol, aromatic, amide or olefin moieties or any combination of the above moieties, made by emulsion polymerization, miniemulsion polymerization, microemulsion polymerization, suspension polymerization, dispersion polymerization or precipitation polymerization can also be used for staining with ruthenium tetraoxide to make non-conductive black polymer particles with controlled properties.

All equivalents, variations and modifications that can be applied to the described present invention by a person skilled in that art, are intended to be included within the scope of this invention as defined by the appended claims.

What is claimed is:

1. An electrophoretic display having an electrophoretic dispersion positioned between an anode and a cathode, wherein said electrophoretic dispersion includes black dielectric electrophoretic particles suspended in a clear medium of a predetermined density, said electrophoretic particles being formed from a composite latex polymer having a core structure and at least one shell layer, said core structure having residual double bonds which have reacted with a metal oxide to produce said black color, said particles having a density substantially equal to said predetermined density of said liquid medium.

2. The display according to claim 1, wherein said core structure and said at least one shell layer are formed by a seeded emulsion polymerization technique.

3. The display according to claim 2, wherein said core structure includes a poly(butadiene-co-styrene) polymer.

4. The display according to claim 3, wherein said at least one shell layer includes a poly(styrene-co-methacrylic acid) polymer.

5. The display according to claim 2, wherein said core structure includes a polystyrene polymer.

6. The display according to claim 5, wherein said at least one shell layer includes a first shell layer and a second shell layer, said first shell layer being composed of polybutadiene and surrounds said polystyrene core and said second shell layer being composed of a poly(styrene-co-methacrylic) polymer and surrounding said first shell layer.

7. The display according to claim 1, wherein said metal oxide includes osmium tetroxide.

8. The display according to claim 1, wherein said metal oxide includes ruthenium tetraoxide.

9. The display according to claim 1, wherein said at least one shell structure is poly(butadiene-co-methacrylic acid) and said core structure is poly(butadiene-co-styrene).

10. The display according to claim 1, wherein said electrophoretic particles are hollow.

11. The display according to claim 10 wherein said electrophoretic particles include a hollow region encapsulated by said at least one shell layer.

* * * * *